United States Patent
Geiger et al.

(10) Patent No.: US 10,335,716 B2
(45) Date of Patent: Jul. 2, 2019

(54) FILTER ELEMENT AND FILTER UNIT

(71) Applicant: Eaton Technologies IP GmbH & Co. KG, Schoenefeld (DE)

(72) Inventors: Guenther Geiger, Ruedesheim (DE); Thorat Chandrakant Kumar, Pune (IN); Manoj Prabhakar Amritkar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/515,157

(22) PCT Filed: Sep. 25, 2015

(86) PCT No.: PCT/EP2015/072135
§ 371 (c)(1),
(2) Date: Mar. 29, 2017

(87) PCT Pub. No.: WO2016/050649
PCT Pub. Date: Apr. 7, 2016

(65) Prior Publication Data
US 2017/0225103 A1    Aug. 10, 2017

(30) Foreign Application Priority Data

Sep. 30, 2014 (IN) .......................... 3110/MUM/2014
Nov. 28, 2014 (GB) .................................. 1421171.8

(51) Int. Cl.
*B01D 25/26* (2006.01)
*B01D 29/41* (2006.01)
*B01D 35/027* (2006.01)

(52) U.S. Cl.
CPC ............. *B01D 25/26* (2013.01); *B01D 29/41* (2013.01); *B01D 35/0273* (2013.01); *B01D 2325/06* (2013.01); *B01D 2325/08* (2013.01)

(58) Field of Classification Search
CPC ...... B01D 25/001; B01D 25/08; B01D 25/04; B01D 25/26; B01D 29/0018; B01D 29/002; B01D 29/0022; B01D 29/0043; B01D 29/03; B01D 29/031; B01D 29/036; B01D 29/038; B01D 29/05; B01D 29/055; B01D 29/07; B01D 29/072; B01D 2325/06;
(Continued)

(56) References Cited

U.S. PATENT DOCUMENTS 3,231,094 A * 1/1966 Wiegand ................ B01D 29/41
   210/487
3,469,372 A * 9/1969 Isogai .................... B01D 53/22
   72/60

(Continued)

FOREIGN PATENT DOCUMENTS

CN     103418171 A    12/2013
CN     103830944 A     6/2014
(Continued)

*Primary Examiner* — Pranav N Patel
(74) *Attorney, Agent, or Firm* — Leydig, Voit & Mayer, Ltd.

(57) ABSTRACT

A filter element has: a carrier element permeable to fluid and having a support surface, the support surface having a surface area increasing contour; and a filter medium deposited onto the support surface of the carrier element forming a filter layer adapted to the surface area increasing contour.

9 Claims, 5 Drawing Sheets

(58) Field of Classification Search
CPC ............ B01D 2325/08; B01D 2275/10; B01D 2275/202; B01D 2275/205; B01D 2275/208; B01D 2239/065; B01D 2239/0654; B01D 2239/069; B01D 69/06; B01D 69/10; B01D 69/105
See application file for complete search history.

(56) References Cited

U.S. PATENT DOCUMENTS

| | | | |
|---|---|---|---|
| 4,032,457 A | 6/1977 | Matchett | |
| 4,549,963 A | 10/1985 | Jensen et al. | |
| 2007/0023290 A1* | 2/2007 | Hawkins | B01D 61/445 204/520 |
| 2010/0096317 A1* | 4/2010 | Morita | B01D 63/081 210/321.84 |
| 2013/0295339 A1* | 11/2013 | Osaka | B01D 69/105 428/174 |

FOREIGN PATENT DOCUMENTS

| | | |
|---|---|---|
| DE | 8717200 U1 | 3/1988 |
| DE | 9016243 U1 | 2/1991 |
| EP | 1174170 A2 | 1/2002 |
| GB | 999085 A | 7/1965 |
| WO | WO 9104089 A1 | 4/1991 |
| WO | WO 9517242 A1 | 6/1995 |
| WO | WO2014114306 * | 7/2014 |

* cited by examiner

FILTER ELEMENT AND FILTER UNIT

CROSS-REFERENCE TO RELATED APPLICATIONS

This application is a U.S. national stage application under 35 U.S.C. § 371 of International Application No. PCT/EP2015/072135, filed on Sep. 25, 2015, and claims benefit to Indian Patent Application No. 3110/MUM/2014 and British Patent Application No. 1421171.8, respectively filed on Sep. 30, 2014, and Nov. 28, 2014. The International Application was published in English on Apr. 7, 2016, as WO 2016/050649 A1 under PCT Article 21(2).

FIELD

The invention relates to a filter element.

BACKGROUND

Filtration is widely used throughout industry, commerce and domestic life. Filtration involves the physical separation of one or more components from a carrying fluid by passage of that fluid through or across a barrier that is permeable only to some of these components. Filtration can be distinguished in depth filtration and cake filtration. Using the depth filtration a particle can be trapped in the depth of the filter medium. Using the cake filtration a thick layer or cake of particles accumulates on the surface of the filter medium.

Depth filters separate coarse and fine haze substances and offer colloid retention rates while simultaneously preserving beneficial ingredients with low color retention. Gentle treatment of flavor and color plays a particularly important role in the filtration of spirits. In addition to reliable separation of fine colloidal and coarsely dispersed haze substances, the aim of filtration includes selective separation of haze-producing long-chain fatty acid esters. Depth filters with a low calcium and magnesium ion content as well as high fusel and essential oil absorbing capacity are used in particular for this purpose.

The production of mineral water, table water, and product water as well as industrial water places particularly high demands on filtration technology. Particular emphasis is placed on reliable particle separation by depth filtering. Depth filters assure safe and reliable filtration. There are multitudes of possible filtration applications in the food industry in which depth filters play a major role. Filtration processes are typically used in the production of gelatin, liquid sugar and invert sugar syrup, glucose, dextrose, extracts, essences, enzyme solutions, and rennin. Filtration is especially important, for example, in the production of edible oils where top priority is placed on retaining taste, vitamins, and the fatty acid composition while removing haze and mucilaginous substances.

U.S. Pat. No. 4,032,457 A discloses a filter cartridge wherein the filter has two or more distinctly different fibers layers with at least one of the fibers layers containing active particles. The different layers are formed in place on the filter by a wet accretion process. The filter has an inner annular core in the form of a perforated tube. The tube might be made of a plastic material such as polypropylene and is perforated with holes. The size of the holes may vary depending on the physical characteristics of the fibers to be accreted onto the tube. The tube functions to provide compressive strength to the filter element and defines a central flow passage through which the filter material is discharged after having passed through the filtering faces which have been accreted onto the tube.

DE 90 16 243 U1 discloses a filter module for filtering fluid media comprising a plurality of annular filter cells which are stacked. The filter cells have a circular ring-shaped form having an outer filter sheet and an intermediate mounted spacing element for keeping open an inner flow passage. The filter cells are stacked along a central filtrate passage element. By this arrangement with stacked filter cells the surface area of the filter medium is increased compared to a filter tube according to U.S. Pat. No. 4,032,457 A.

The filter sheets according to DE 90 16 243 U1 are manufactured in a papermaking process. The manufacturing of the filter sheets is a wet-laid papermaking process with all ingredients of the filter medium being suspended in water with a special mixer. The consistency of the suspension may range from 0.5 to 5.0%. The suspension (pulp) is dewatered on a Fourdrinier wire mesh. After dewatering, the flat paper is dried. The filter sheets are cut out from the dried paper and arranged onto the spacing elements in order to obtain filter elements which can be stacked. The dried paper can also be used for rolled filter modules and single use filter units.

SUMMARY

An aspect of the invention provides a filter element comprising: a carrier element, which is permeable to fluid, including a support surface having a surface area increasing contour; and a filter medium, deposited onto the support surface of the carrier element, forming a filter layer adapted to the surface area, increasing contour.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
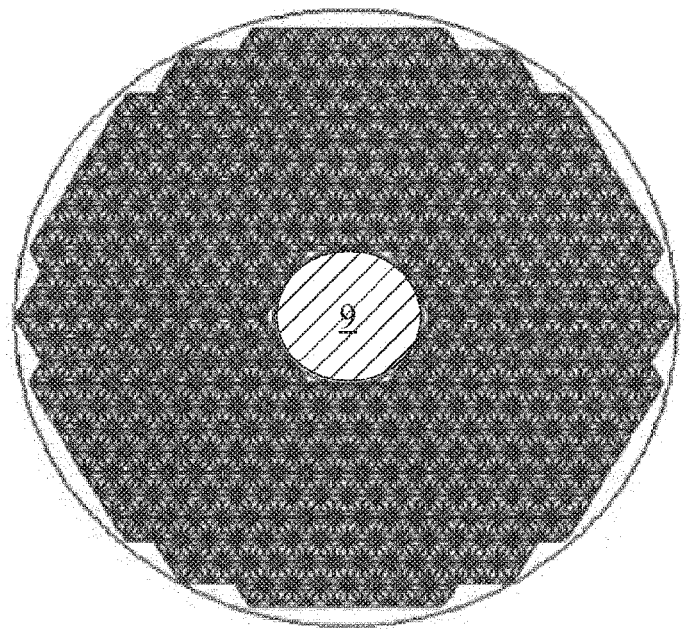
FIG. 1 a top view of a first embodiment of a filter element having a lenticular shape.

The present invention particularly refers to, but is not limited to, a filter element for depth filtration. Depth filtration is applicable in a large variety of applications. Depth filtration removes impurities and undesired particles from foods and beverages to enhance the natural flavor. The clear trend worldwide continues to be towards cold-sterile filtered draft and bottled beer. Gentle beer production without heat treatment thus requires a fully developed and reliable filtration technology. Beer-contaminating microorganisms are removed while simultaneously retaining the brightness of the beer and improving the chemical-physical stability. Great importance is attached to microbiological safety when depth filtration is used in the area of wine production.

An aspect of the present invention provides a filter element that has an improved filter performance and to provide an easy process of manufacturing such a filter element.

An aspect of the invention relates to a filter element comprising a carrier element being permeable to fluid and having a support surface wherein a filter layer is deposited to the support surface An aspect of the invention provides a filter element comprising a carrier element being permeable to fluid and having a support surface, said support surface having a surface area increasing contour. The filter element further comprises a filter medium deposited onto the support surface of the carrier element forming a filter layer adopted to the surface area increasing contour of the carrier element. The filter layer will have an increased filter area which will result in an improved filter performance of the filter element.

The filter element itself already provides for an increased surface area of the filter layer. Of course, in order to further increase the surface area of the filter layer a plurality of filter elements according to the invention may be provided in a filter unit, similarly as described in the prior art DE 87 17 200 U1.

A filter element according to an aspect of the invention also provides for an easy manufacturing of the filter element because the carrier element is a more or less rigid element comprising the surface area increasing contour and the filter medium is disposed onto the support surface of the carrier element so that by depositing the filter medium onto the support surface the filter medium forms a filter layer following the surface area increasing contour. In addition, after the filter layer has been produced it does not have to be removed from the carrier element to be used. It stays on the carrier element which is part of the filter element.

For manufacturing a filter element according to an aspect of the invention a wet-laid papermaking process is performed directly onto the support surface of the carrier element having the three dimensional surface area increasing contour. The carrier element is immersed into a suspension of water and the ingredients for the filter medium. The filter medium is deposited onto the support surface by vacuum suction through the carrier element. During the vacuum suction a uniform layer of the suspended filter medium is built onto the support surface of the carrier element. Due to the flow resistance of the built layer, a homogenous growth of the layer on the support surface occurs. The process is stopped when the thickness of the filter medium is grown up to a sufficient thickness, preferably between 2 and 10 mm. Eventually, the carrier element is pulled out of the suspension, dewatered and dried. After drying the filter element it can be assembled to a filter unit. It is not necessary to remove the filter layer from the carrier element. The carrier element is part of the filter element.

Preferably, the surface area increasing contour comprises convex and/or concave surface portions. The convex and/or concave surface portions may have a polyhedral shape such as a tetrahedral shape. Compared to other 3D-shapes, the tetrahedral shape has the advantage of the best surface area to volume ratio. This means that the surface area compared to the volume, which is enveloped by the filter layer, is as big as possible.

The carrier element may comprise a screen, a mesh or an open porous body so that it is permeable to fluid. The carrier element may comprise open porous plastic material, such as polyolefin porous material or porous glass.

In particular the filter medium comprises a wet-laid nonwoven fibrous material. It is also possible to have a multiple layer structure obtained by wet-laid process with several different formulations, e.g. small pore and then a second layer with bigger pores.

The filter medium preferably comprises at least one material of the group of materials comprising cellulose fibers, diatomaceous earth, perlite, active carbon, wet strength resin, bicomponent fibers, polymer powder, absorbers, glass fibers, acrylic resin and epoxy resin.

The carrier element may have a lenticular or disc shape. The carrier element can have two outer surface portions facing away from each other on a non-filtrate side of the filter element and constituting the support surface.

Preferably, the carrier element comprises two screen-like carrier members each of which forms one of said outer surface portions of the carrier elements and wherein the outer surface portions are facing away from each other. Between the carrier elements the filtrate side of the filter element is realized wherein the filtrate fluid can be led to a central passage way. Alternatively, the carrier element can be made of a porous material having a lenticular or disc shape having two outer surface portions facing away from each other. Between these surfaces the body of the carrier element being made of the porous material can conduct the filtrate fluid to a central passage way.

Preferably, the screen-like carrier members are sealingly connected to each other at an outer circumference in order to obtain an inner space on the filtrate side within the carrier element.

A filter unit can be obtained by providing a plurality of filter elements as described above which are consecutively arranged along a longitudinal axis. Any adjacent pair of filter elements face each other with one of their outer surface portions.

The surface area increasing contour of each carrier element comprises convex and/or concave surface portions wherein the convex and/or concaves surface portions of an adjacent pair of filter elements mesh with each other. This means that adjacent filter elements are positioned as near to each other as possible without contacting each other in the area of the filter layers.

In order to enhance the possibility to arrange two adjacent filter elements as near as possible to each other, a first filter element of any pair of adjacent filter elements has convex surface portions on its outer surface facing a second filter element of the pair of adjacent filter elements and wherein said second filter element of said pair of adjacent filter elements has concave surface portions on its outer surface which faces said first filter element. The convex surface supportions of the first filter element can be arranged within the concave surface portions of the second filter element without being in contact with the second filter element. Therefore, between the convex surface portions of the first filter element and the concave surface portions of the second filter element a fluid can flow. The space between the convex surface portions of the first filter element and the concave surface portions of the second filter element constitute a passageway for the unfiltered fluid.

FIGS. 1 to 4 disclose a first embodiment of a filter element 1 and are described in the following together. The filter element 1 comprises a carrier element 2 having a filter layer 3 which is deposited onto a support face 4 of the carrier element 2. The carrier element 2 is permeable to fluid. In the present case the carrier element 2 is preferably made of a mesh or a screen having an outer surface constituting the support surface 4 and an inner space constituting a peripheral passageway 10. The carrier element 2 and, hence, the filter element 1 has a lenticular shape with a central passageway 9 which penetrates the filter element 1 along a longitudinal axis L. The filter element 1 has an annular ring-shape forming the central passageway 9. The filter element 1 has an upper outer surface portion 5 and a lower outer surface portion 6 which are facing away from each other. The upper outer surface portion 5 is formed by a filter layer onto an upper carrier member 7 and the lower outer surface portion 6 is formed by a filter layer on a lower carrier member 8. The upper carrier member 7 and the lower carrier member 8 are connected to each other along a circumference 12 around the longitudinal axis L and are spaced from each other in an axial direction so that between the upper carrier member 7 and the lower carrier member 8 the peripheral passageway 10 is provided. The upper carrier member 7 and the lower carrier member 8 are formed substantially as an annular ring.

The upper outer surface portion 5 and the lower outer surface portion 6 together form the support surface 4 of the carrier element 2. The support surface 4 has a plurality of convex surface portions 11 having a tetrahedral shape, which will result in an increase of the filter area. The filter medium constituting the filter layer 3 is deposited onto the support surface 4, i.e. the upper outer surface portion 5 and the lower outer surface portion 6, so that the filter layer 3 follows the contour of the support surface 4. The convex surface portions 11 constitute a surface area increasing contour of the support surface 4.

In use the central passageway 9 can be fluidly connected to a discharge passageway so that unfiltered fluid can pass from the outside of the filter element 1 the filter layer 3 and afterwards the carrier element 2 into the peripheral passageway 10. From the peripheral passageway 10 the now filtered fluid will be led radially inwardly to the central passageway 9 in order to be transferred to the discharge passageway of a filter unit.

Figure 5:
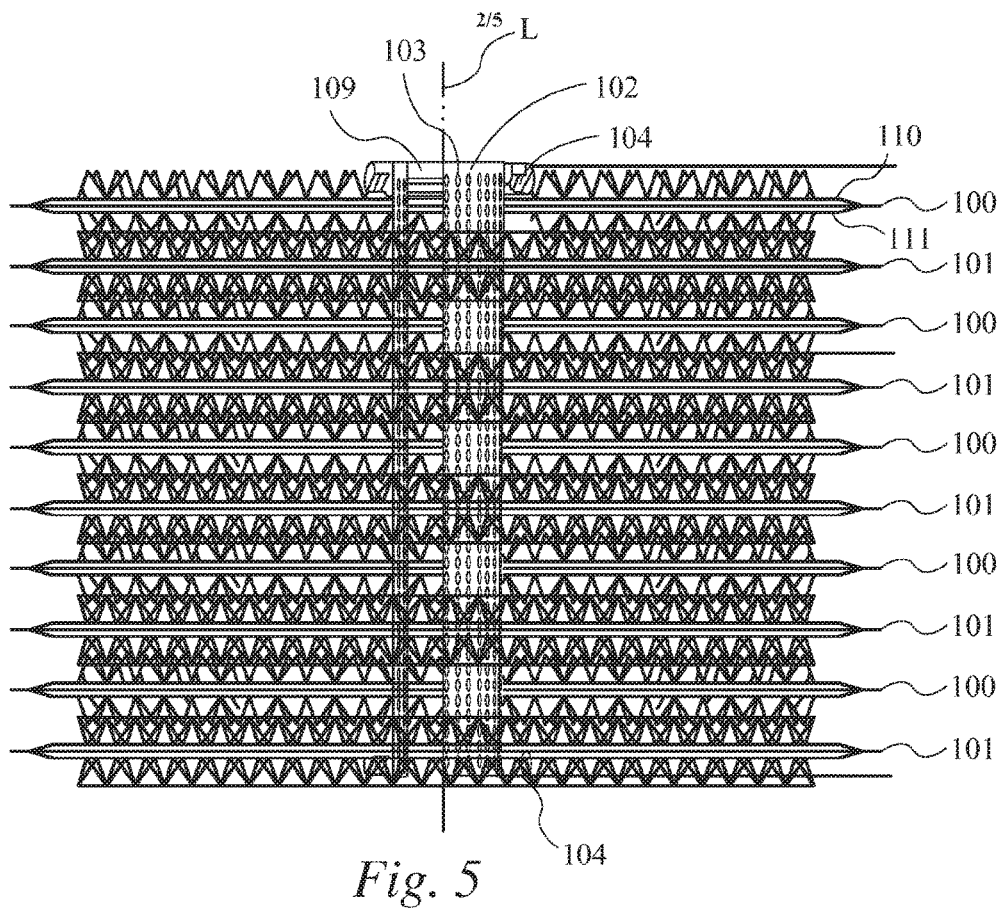
FIG. 5 a sectional view of a filter unit having a plurality of filter elements according to FIGS. 1 to 3.
Figure 6:
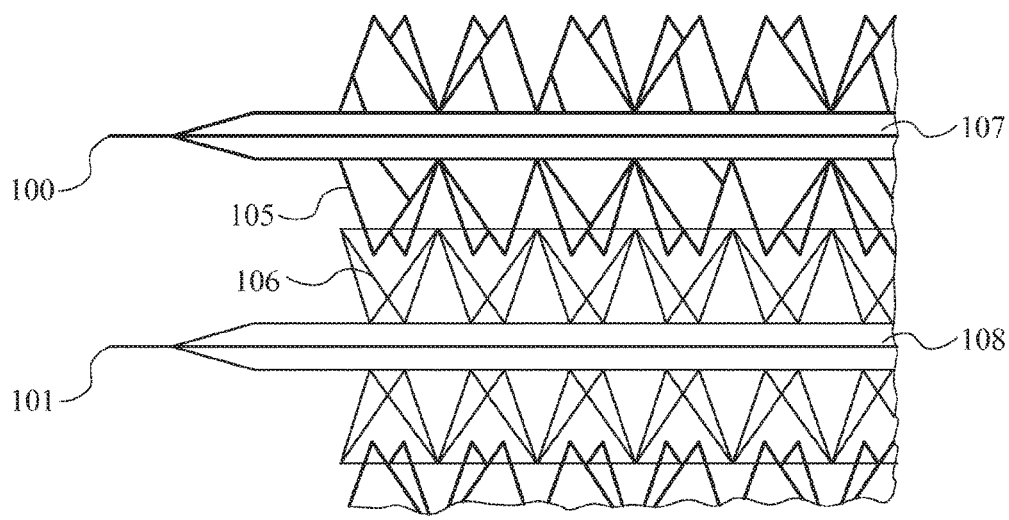
FIG. 6 an enlarged view of a pair of adjacent filter element of the filter unit according to FIG. 4.

FIGS. 5 and 6 depict a filter unit with a plurality of filter elements. The filter elements 100, 101, are stacked along their longitudinal axis L onto a tube 102. The filter elements 100, 101 are substantially comparable to the embodiment according to FIGS. 1 to 3, which means the filter elements 100, 101 according to FIGS. 5, 6 have also a lenticular shape with a central passageway. The central passageway serves to stack the filter elements 100, 101 onto the tube 102. The filter elements 100, 101 also have a peripheral passageway 107, 108 as described in regard to the embodiment according to FIGS. 1 to 3. The peripheral passageways 107, 108 of each of the filter elements 100, 101 is fluidly in communication with holes 103 within the tube 102 so that fluid can pass from the peripheral passageways 107, 108 through the holes 103 into the inner of the tube 102 which forms a discharge passageway 109. Between the outer surfaces of adjacent filter elements 100, 101 the holes 103 are sealed to the outside, i.e. the unfiltered side, by sealing rings 104. For the sake of clarity only the upper and the lower sealing ring 104 is shown in FIG. 5. However, between each of the filter elements 100, 101 a sealing ring 104 is provided.

The filter unit comprises two different types of filter elements 100, 101, first filter elements 100 and second filter elements 101 which are alternately arranged along the longitudinal axis L. The filter elements 100, 101 of each pair of adjacent filter elements 100, 101 do have a different shape of their support surfaces. The first filter elements 100 do have convex surface portions 105 according to the embodiment of FIGS. 1 to 3 and do have a shape according to the sectional view of FIG. 4.

The second filter elements 101 do have concave surface portions 106. The convex surface portions 105 are of tetrahedral shape. The concave surface portions 106 also have a tetrahedral shape but in a negative form compared to the convex surface portions 105.

The filter elements 100, 102 are formed such that each convex surface portion 105 faces, in a longitudinal direction along the longitudinal axis L, a concave surface portion 106. As best can be seen from FIG. 6 the convex surface portions 105 and the concave surface portions 106 are meshing with each other. This means that the convex surface portions 5 are arranged partly within the concave surface portions 106 in an axial direction.

The filter elements 100, 101 are not in contact to each other, at least over the major part of the outer surfaces. Between the convex surface portions 105 of the first filter elements 100 and the concave surface portions 106 of adjacent second filter elements 101 a passageway for unfiltered fluid is established.

Figure 3:
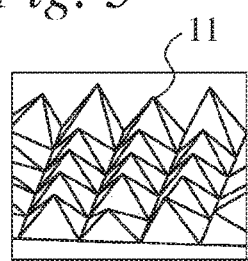
FIG. 3 an enlarged perspective view of a surface area of the filter element according to FIGS. 1 and 2.
Figure 2:
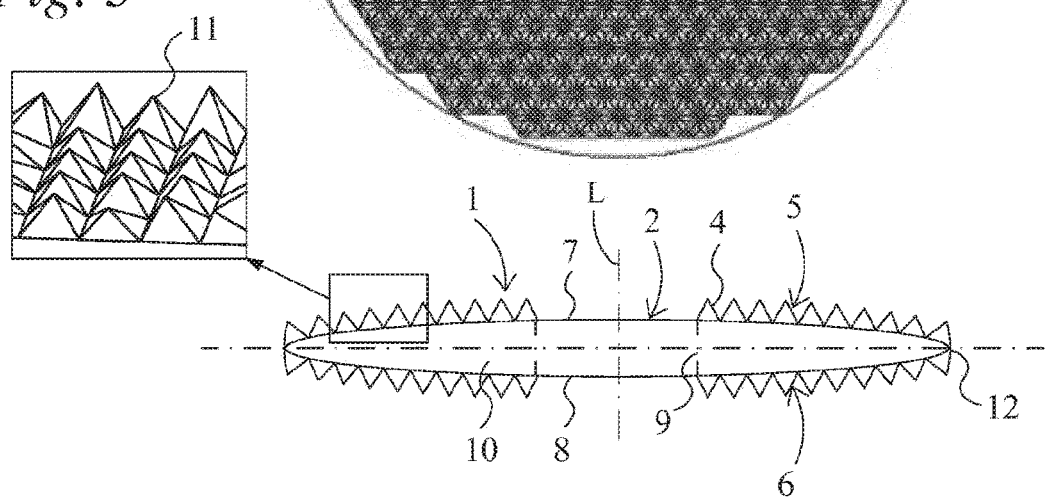
FIG. 2 a sectional view of the filter element according to FIG. 1.
Figure 4:
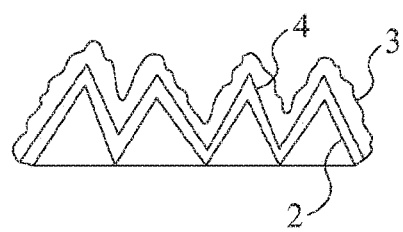
FIG. 4 an enlarged sectional view of a surface area of the filter element according to FIGS. 1 and 2.
Figure 7:
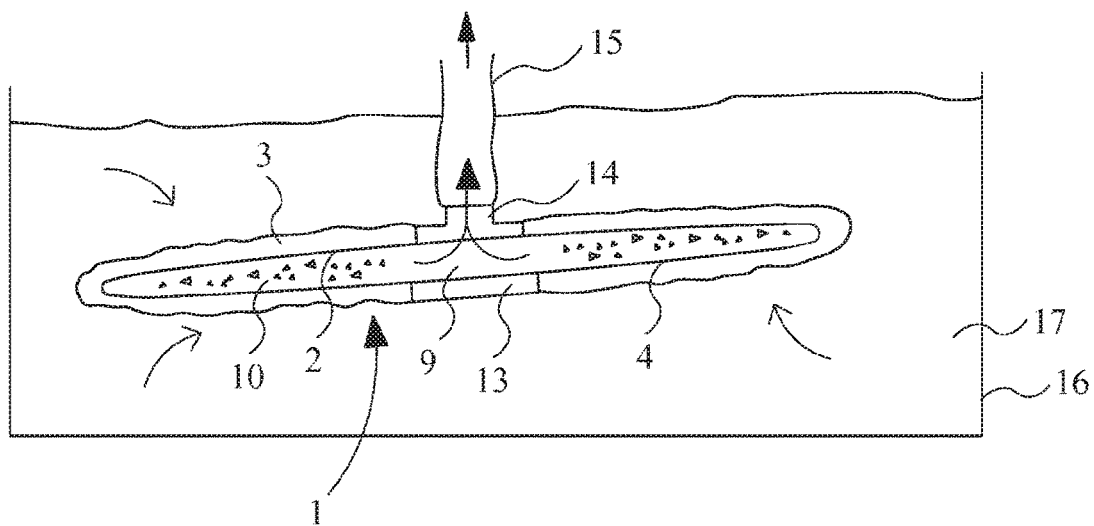
FIG. 7 a sketch of the manufacturing process of a filter element according to FIGS. 1 to 3.

FIG. 7 shows a filter element 1 according to FIGS. 1 to 3 wherein for simplification reasons the surface area increasing contour is not shown. For manufacturing the filter element 1 the central passageway 9 of the carrier element 2 is sealed by a sealing plate 13 on a lower side. On an upper side the central passageway 9 is provided with an adapter 14 which is connected to a tube 15 or a hose producing a vacuum within the central passageway 9 and, hence, within the peripheral passageway 10. The carrier element 2 is submerged into a tank 16 which is filled with a suspension of fluid, preferably water, and ingredients for filter medium. The filter medium is deposited onto the support surface 4 of the carrier element 2 by vacuum suction through the tube 15, the central passageway 9 and the peripheral passageway 10 so that water flows from the tank 17 through the carrier element 2 into the peripheral passageway 10 and the central passageway 9 and is discharged through the tube 15. Thereby, the filter medium is deposited onto the support surface 4 building a uniform layer of the suspended filter medium. Due to the flow resistance of the built filter layer 3 a homogeneous growth of the filter layer 3 on the support surface 4 occurs. The process is stopped when the thickness of the filter layer 3 is grown up to a sufficient thickness and the carrier element 2 is pulled out of the suspension 17. After drying the filter element 1 it can be assembled to a filter unit.

The carrier element 2 can be made of a mesh or screens. Alternatively, the carrier element 2 can be made of a porous material body which constitutes a peripheral passageway 10. Hereby the carrier element 2 needs not to be hollow because of the permeability to fluid.

Figure 8:
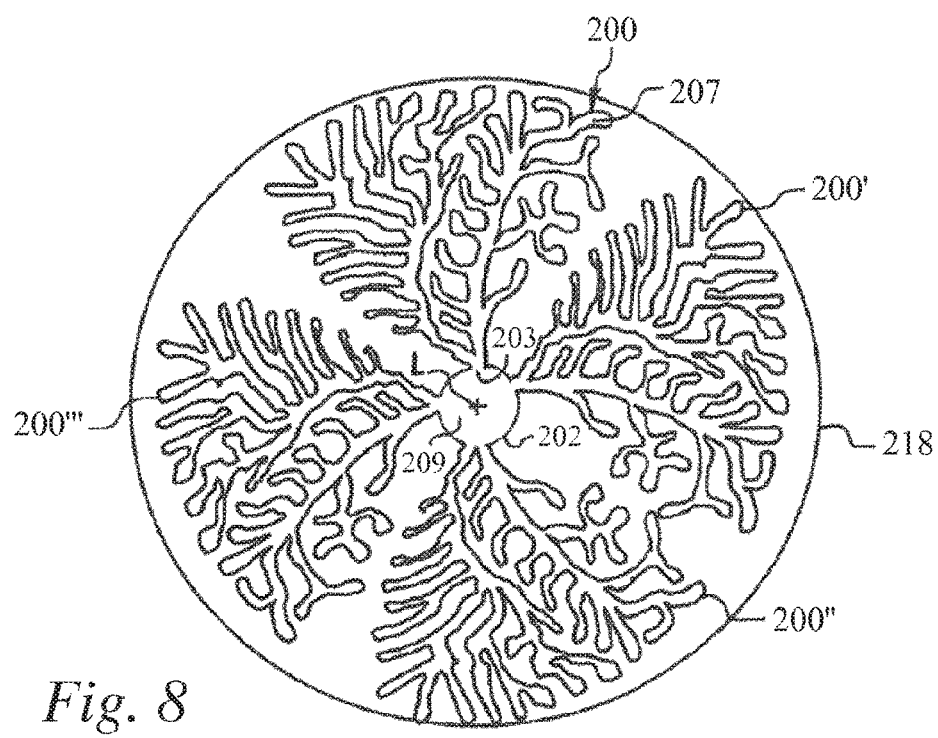
FIG. 8 a cross-sectional view of a second embodiment of a filter element having a coral-like structure as a surface increasing structure.

FIG. 8 shows a second embodiment of a filter element 200 having a cross-section which is shaped coral-like with a tree structure. Several filter elements 200, 200', 200", 200''' are arrange around a longitudinal axis and are line linked to a central tube 202 via holes 203. The filter elements 200, 200', 200", 200''' are ramify starting from the junction between the filter elements 200, 200', 200", 200''' and the tube 202 into an increasing number of branches. The filter elements 200, 200', 200", 200''' and the tube 202 constitute a filter unit. The filter elements 200, 200', 200", 200''' form, on the filtrate side of the filter elements 200, 200', 200", 200''', peripheral passageways 207 which lead to the central tube 202 via holes 203 to discharge the filtrated fluid. On the opposite side of the peripheral passageways 207 the filter elements 200, 200', 200", 200''' are provided with a filter layer on a support face of a carrier element. The filter elements 200, 200', 200", 200''' are preferably in extruded form parallel to the longitudinal axis L. The filter elements 200, 200', 200", 200''' together with the tube 202 can easily be inserted into a cylindrical housing 218.

Figure 9:
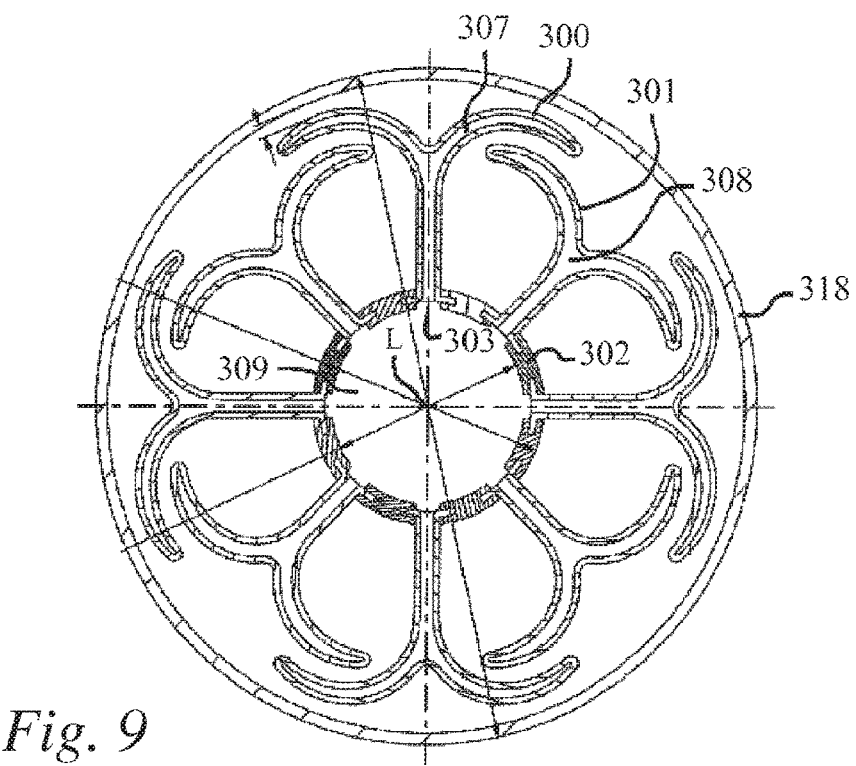
FIG. 9 a cross-sectional view of a third embodiment of a filter element having a palm-tree-like structure as a surface increasing structure.

FIG. 9 shows a third embodiment of a filter element having a cross-section which is shaped Palm-tree-like. The third embodiment is comparable to the second embodiment. There are provided two different filter elements 300, 301 which are slightly different in their outer dimensions. The filter elements 300, 301 are also in extruded form parallel to the longitudinal axis L and are connected to slats 302, so that the filter elements 300, 301 together with the slats 302 form a central passageway 309 to discharge filtrated fluid. The filter elements 300, 301 and the slats 302 constitute a filter unit. The entire filter unit can easily be inserted into a cylindrical housing 318.

Figure 10:
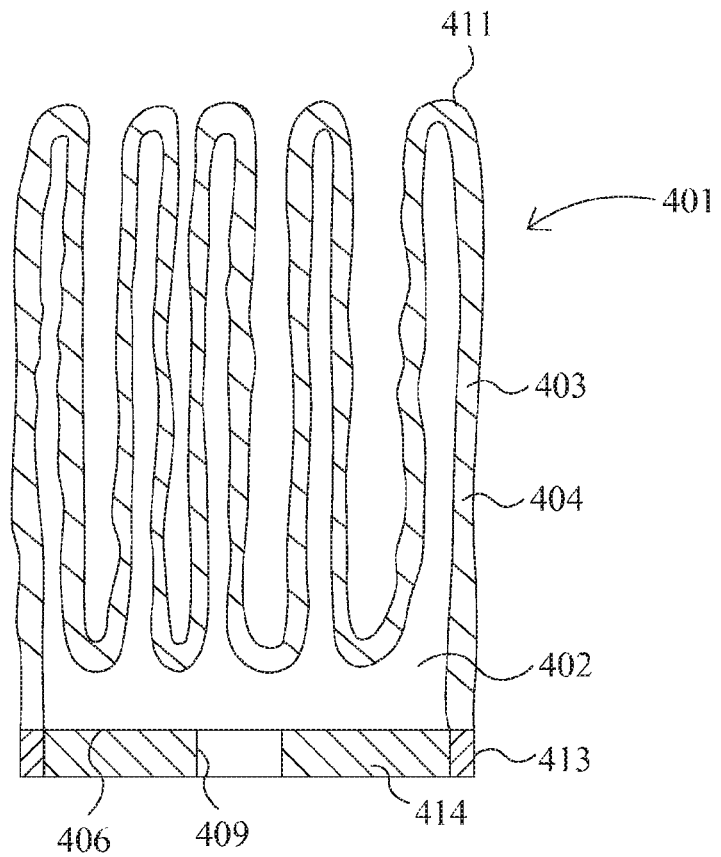
FIG. 10 a sectional view of a fourth embodiment of a filter element having sticks or fingers as a surface increasing structure.
Figure 11:
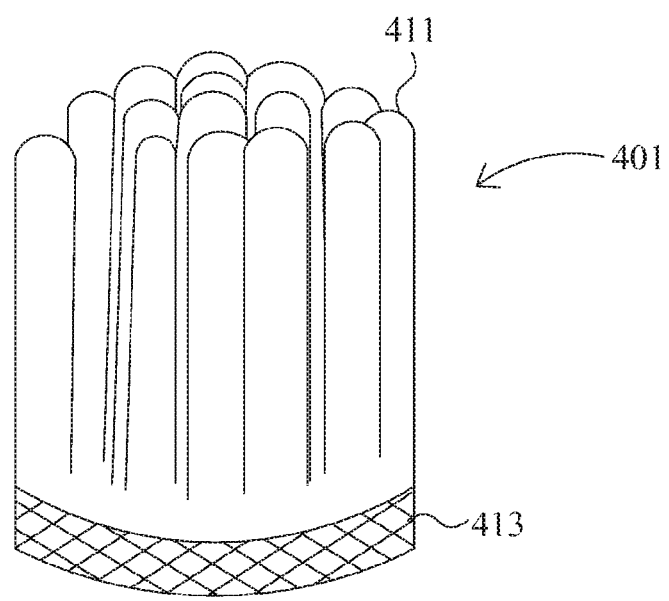
FIG. 11 a perspective view of the filter element according to FIG. 10.

FIGS. 10 and 11 show a fourth embodiment of a filter element 401 having sticks or fingers 411 as surface increasing structure. The filter element 401 comprises a carrier element 402. A filter layer 403 is deposited onto a support face 404 of the carrier element 402. The carrier element 402 is permeable to fluid. In the present case the carrier element 402 is a body made of porous material. It can also be made of a mesh or screen having an outer surface constituting the support surface 404 and an inner space constituting a peripheral passageway.

The support surface 404 has a plurality of convex surface portions 411 in the form of sticks or fingers, which will result in an increase of the filter area. The filter medium constituting the filter layer 403 is deposited onto the support surface 404, so that the filter layer 403 follows the contour of the support surface 404. The convex surface portions 411 constitute a surface area increasing contour of the support surface 404.

The carrier 402 has a flat lower surface 406 which is covered by a sealing plate 414 with a circumferential seal 413 for sealingly connecting the filter element 401 within a housing of a filter unit. In the centre of the sealing plate there is provided a central passageway 409. In use the central passageway 409 can be fluidly connected to a discharge passageway so that unfiltered fluid can pass from the outside of the filter element 401 the filter layer 403 and afterwards the carrier element 402. The filtered fluid will be led inwardly to the central passageway 409 in order to be transferred to the discharge passageway of a filter unit.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE NUMERALS LIST 1 filter element
2 carrier element
3 filter layer
4 support surface
5 upper outer surface portion
6 lower outer surface portion
7 upper carrier member
8 lower carrier member
9 central passageway
10 peripheral passageway
11 convex surface portion
12 circumference
13 sealing plate
14 adapter
15 tube
16 tank
17 suspension
100 first filter element
101 second filter element
102 tube
103 hole
104 sealing ring
105 convex surface portion
106 concave surface portion
107 peripheral passageway
108 peripheral passageway
109 discharge passageway
110 outer surface portion
111 outer surface portion
200 filter element
200' filter element
200" filter element
200''' filter element
202 tube
203 hole
207 peripheral passageway
218 cylindrical housing 300 filter element
301 filter element
302 slat
303 hole
307 peripheral passageway
308 peripheral passageway
309 central passageway
318 housing
401 filter element
402 carrier element
403 filter layer
404 support face
406 lower surface
409 central passageway
411 convex surface portion
413 circumferential seal
414 sealing plate
L longitudinal axis

The invention claimed is:

1. A unit comprising a plurality of filter elements consecutively arranged along a longitudinal axis, each of the plurality of filter elements comprising: a carrier element, which is permeable to fluid, including a support surface having a surface area increasing contour; and a filter medium, deposited onto the support surface of the carrier element, forming a filter layer adapted to the surface area increasing contour, wherein the carrier element includes a first and second outer surface portions, the outer surface portions facing away from each other on a non-filtrate side of the filter element and constituting the support surface such that both outer surface facing portions include the surface area increasing contour, wherein any adjacent pair of filter elements face each other with one of their outer surface portions, wherein the surface area increasing contour of each of the carrier elements includes convex and concave surface portions, and wherein the convex and concave surface portions of any adjacent pair of filter elements mesh with each other such that the convex surface portions are arranged partially within the concave surface portions in an axial direction.

2. The unit of claim 1, wherein the convex or concave surface portions have a polyhedral shape.

3. The unit of claim 1, wherein the carrier element includes a screen, a mesh, or an open porous body.

4. The unit of claim 1, wherein the carrier element includes open porous plastic material.

5. The unit of claim 1, wherein the filter medium includes a wet-laid nonwoven fibrous material.

6. The unit of claim 1, wherein the filter medium includes a cellulose fiber, diatomaceous earth, perlite, active carbon, wet strength resin, bicomponent fiber, polymer powder, absorber, glass fiber, acrylic resin, or an epoxy resin.

7. The unit of claim 1, wherein the carrier element has a lenticular or disc shape.

8. The unit of claim 1, wherein the carrier element includes a first and a second screen-like carrier member, wherein each carrier member forms one of the outer surface portions of the carrier element.

9. The unit of claim 8, wherein the screen-like carrier members are sealingly connected to each other at an outer circumference.

* * * * *